United States Patent [19]

Levin

[11] Patent Number: 5,386,660
[45] Date of Patent: Feb. 7, 1995

[54] FISHING HOOK WITH CURVED BARB

[76] Inventor: John M. Levin, 412 Fairview Rd., Narberth, Pa. 19072

[21] Appl. No.: 101,185

[22] Filed: Aug. 3, 1993

[51] Int. Cl.⁶ ............................................. A01K 83/00
[52] U.S. Cl. .................... 43/43.16; 43/44.82
[58] Field of Search .................... 43/43.16, 44.8, 44.82

[56] References Cited

U.S. PATENT DOCUMENTS

| | | | |
|---|---|---|---|
| 666,309 | 1/1901 | Fiege | 43/44.82 |
| 779,843 | 1/1905 | Fredricks | 43/43.16 |
| 1,502,781 | 7/1924 | Jamison . | |
| 1,992,969 | 3/1935 | Soukup | 43/44.8 |
| 2,317,900 | 4/1943 | Freeman . | |
| 2,490,583 | 12/1949 | Dunkleburger | 43/44.82 |
| 2,493,487 | 1/1950 | Grimm | 43/44.82 |
| 2,538,052 | 1/1951 | Schwarzer . | |
| 2,570,468 | 10/1951 | Matthes . | |
| 2,597,679 | 5/1952 | Schwarzer . | |
| 2,679,708 | 6/1954 | Matthes . | |
| 2,792,664 | 5/1957 | Schwarzer . | |
| 2,823,485 | 2/1958 | Traumüller . | |
| 2,841,914 | 7/1958 | Butler . | |
| 3,755,954 | 9/1973 | Lucius | 43/43.16 |
| 4,503,634 | 3/1985 | Hamayasu | 43/43.16 |
| 4,570,373 | 2/1986 | Brief . | |
| 4,723,372 | 2/1988 | Moser . | |
| 4,905,403 | 3/1990 | Manno . | |

FOREIGN PATENT DOCUMENTS 0027166 of 1911 United Kingdom ............... 43/43.16

*Primary Examiner*—P. Austin Bradley
*Assistant Examiner*—James Miner
*Attorney, Agent, or Firm*—Caesar, Rivise, Bernstein, Cohen & Pokotilow, Ltd.

[57] ABSTRACT

A fishing hook resistant to accidental dislodgement from the mouth of a fish, yet which does not pose a snagging hazard to persons handling it. The hook comprises a shank portion, at least one bent return portion, and a barb at the upper end of the return portion. The return portion of the hook has a longitudinal axis which is generally parallel to the longitudinal axis of the shank. The barb terminates in a sharply pointed free end contiguous with a generally semi-tear-drop shaped, relatively blunt, edge surface. That edge surface includes a curved portion spaced laterally of the longitudinal axis of the return portion of the hook and a contiguous undercut portion merging with the return portion of the hook. The curved portion of the edge surface may be directed toward or away from the shank of the hook.

11 Claims, 1 Drawing Sheet

5,386,660

FISHING HOOK WITH CURVED BARB

BACKGROUND OF THE INVENTION

This invention relates generally to fishing devices, and more particularly to fishing hooks.

Numerous fishing hooks are commercially available which include barbs or other means for retaining the bait on the hook, and enabling the hook to be set in the mouth of a striking fish so that it is resistant to dislodgement. While such hooks are suitable for their intended purpose, they suffer from a major drawback. In particular, the barbs of such hooks are constructed so that if they accidentally pierce the skin of a person handling the hook, or that person's clothing, or some other material, e.g., a fishing net, tend to snag and be resistant to release. In the case where the barb of a conventional hook pierces the skin of a person, release of the barb may require surgery to cut the barb out. Moreover, such hooks are difficult to remove from the fish's mouth, thereby resulting in damage to the fish. This factor is a considerable drawback if the fish is undersize, so that it must be put back.

Various barbless fishing hooks are also commercially available. While such hooks overcome the problems of hook snagging, they do so at the expense of effectiveness of operation. In this regard barbless hooks have difficulty in securing the bait in place and in keeping the hook set within the fish's mouth.

In order to overcome the disadvantages of barbed hooks and barbless hooks, some fishing hooks have been specially constructed to include elements which lock the hook in place within the fish's mouth, yet which render the hook resistant to sticking or snagging on people, clothing, etc. However, such designs are relatively complex.

Examples of some prior art fishing hooks are found in the following U.S. Pat. Nos. 1,502,781 (Jamison); 2,317,900 (Freeman); 2,538,052 (Schwarzer); 2,570,468 (Matthes); 2,597,679 (Schwarzer); 2,679,708 (Matthes); 2,792,664 (Schwarzer); 2,823,485 (Traumuller); 2,841,914 (Butler); 4,570,373 (Brief); 4,723,372 (Moser); and 4,905,403 (Manno).

OBJECTS OF THE INVENTION

Accordingly, it is a general object of this invention to provide a system which overcomes the disadvantages of the prior art.

It is a further object of this invention to provide a fishing hook which is easy to set within the mouth of a fish and which, once set, is resistant to dislodgement from the mouth of a fish.

It is a further object of this invention to provide a fishing hook constructed to enable it to be readily removed from a person or from clothing or other material in the event that it accidentally pierces the person, clothing or other material.

It is a further object of this invention to provide a fishing hook having a barb for retaining bait on the hook.

SUMMARY OF THE INVENTION

These and other objects of this invention are achieved by providing a fishing hook comprising a shank portion, a bent return portion, and a barb. The return portion has a longitudinal axis. The barb terminates in a sharply pointed free end formed by an edge surface. The edge surface comprises a first portion extending backward from the barb's point at an acute angle to the longitudinal axis of the return portion. The edge surfaces also include a curved second portion contiguous with the first portion and spaced laterally from the longitudinal axis, and a slightly undercut third portion contiguous with the second portion. The undercut third portion merges with the return portion of the hook.

BRIEF DESCRIPTION OF THE DRAWING

Other objects and many of the attendant advantages of this invention will be readily appreciated as the same becomes better understood by reference to the following detailed description when considered in connection with the accompanying drawings wherein.

DETAILED DESCRIPTION OF THE PREFERRED EMBODIMENT

Figure 1:
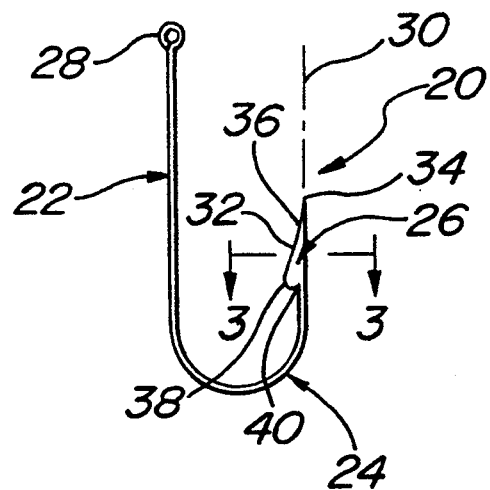
FIG. 1 is a side elevational view of one embodiment of single, inwardly-barbed fishing hook constructed in accordance with this invention.

Referring now in greater detail to the figures there is shown at 20 in FIG. 1 one embodiment of a fishing hook constructed in accordance with this invention. The hook 20 is arranged to be used on a conventional fishing line in a conventional manner. However, as will be described in detail later the hook is constructed so that it will readily retain bait thereon, it will "set" in the mouth of a fish easily, and once set will be resistant to accidental dislodgement. Moreover, the hook can be readily removed from the mouth of a fish or from the tissue of a person handling the hook or fabric of the person's clothing or some other adjacent material, e.g., a fishing net, should it accidently pierce the person, clothing, or net.

Figure 4:
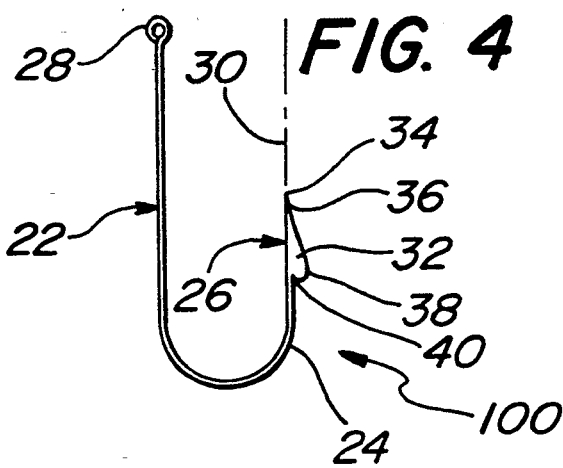
FIG. 4 is a side elevational view of an alternative embodiment of a single, outwardly-barbed fishing hook constructed in accordance with this invention.
Figure 5:
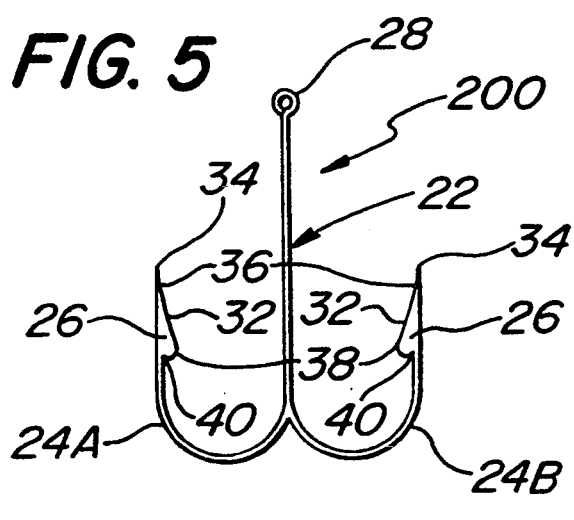
FIG. 5 is a side elevational view of a double, inwardly-barbed alternative embodiment of a fishing hook constructed in accordance with this invention.
Figure 6:
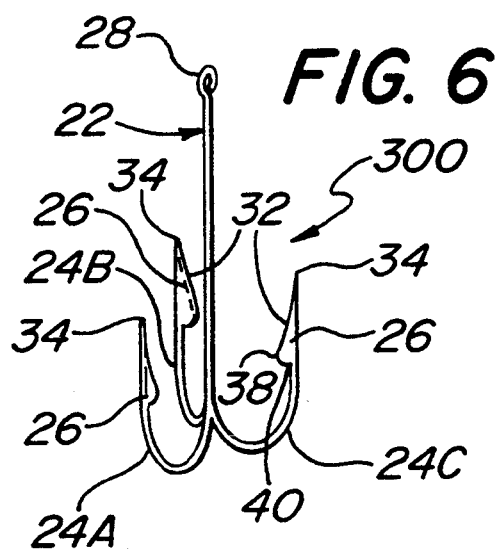
FIG. 6 is a side elevational view of a triple, inwardly-barbed alternative embodiment of a fishing hook constructed in accordance with this invention.

In FIGS. 4–6 there are shown alternative embodiments 100, 200, and 300, respectively, of single, double, and triple barbed hooks constructed in accordance with this invention.

Each fishing hook 20, 100, 200, and 300 basically comprises a shank portion 22 and at least one bent return portion 24 having a barb 26 at the upper end thereof. The hook can be formed as an integral unit of any suitable material, e.g., metal or plastic. The shank portion is of conventional construction and linear, but of cylindrical cross section. The shank portion 22 terminates at its upper end in a conventional eyelet 28. The eyelet 28 is arranged to be connected to a fishing line (not shown) via any conventional means, e.g., a snap-fastener (not shown), a knot of the fishing line, etc.

The lower end of the shank portion 22 merges into the return portion 24. That portion is also of conventional construction, e.g., is of generally U-shape having an upwardly extending linear section having a longitudinal axis 30. The cross section of the return portion is also circular except for its upper end, which is generally flat and which defines the barb 26.

In the embodiments 20 and 100 of FIGS. 1 and 4, respectively, the hook includes a single return portion 24 having a barb 26 at its upper end. In the embodiment 200 of FIG. 5 the hook includes a pair of return portions 24A and 24B. Each return portion projects radially outward from the longitudinal axis of the shank portion when viewed from the top of the hook and includes a respective barb 26 at its upper end. In the embodiment 200 of FIG. 6 the hook includes three return portions 24A, 24B, and 24C, each projecting radially outward from the longitudinal axis of the shank portion and equidistantly spaced, i.e., spaced 120 degrees, from one another when viewed from the top or bottom of the hook. Each of the return portions 24A, 24B, and 24C includes a respective barb 26 at its upper end.

The barbs 26 of this invention can take various forms. For example, the barb 26 is formed, e.g., swaged or molded, so that it is a flat or planar when view from the front (FIG. 2) or rear, yet it includes one semi-tear-drop shaped edge surface 32 when viewed from the side (FIG. 1). The edge surface 32, may be directed inwardly towards the shank as in the embodiments 20, 200 and 300, or may be directed outward away from the shank as in the embodiment 100. In any case the edge surface 32 extends downward from a sharply pointed tip 34 and is blunt when viewed from the front (see the enlarged section of FIG. 3). In other embodiments, not shown, the barb 26 may include plural edge surfaces 32, each extending radially outward from the longitudinal axis of the upper end of the associated return section when viewed from the top of the hook.

Figure 2:
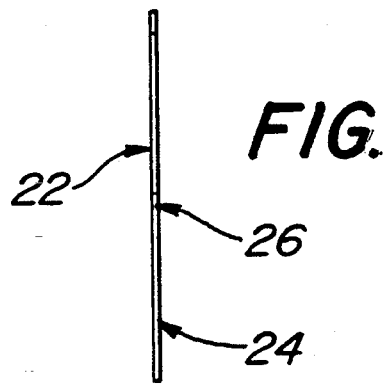
FIG. 2 is a front elevational view of the fishing hook of FIG. 1.
Figure 3:
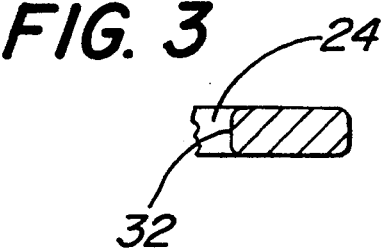
FIG. 3 is an enlarged sectional view taken along lines 3—3 of FIG. 1.

As can be seen clearly in FIGS. 1, 2, and 3 the edge surface 32 basically comprises a first portion 36, a second portion 38, and a third portion 40. The first portion 36 of the edge surface 32 is contiguous with the barb's point 34, and in fact forms an extension thereof. The first portion 36 extends backward or downward from the point 34 at an acute angle to the longitudinal axis 30 and may be linear or slightly concave (as shown). The second portion 38 is contiguous with the first portion 36 is directed away from the axis 30 and comprises a smooth convex curve or arc. Thus, the second portion 38 is spaced laterally from the longitudinal axis 30 of the linear section of the hook's return. The third portion 40 of the edge surface 34 comprises a slightly undercut curve located contiguous with the second portion 38. The third portion 40 merges with the linear return portion of the hook.

As should be appreciated by those skilled in the art a hook having a barb constructed as described above offers significant advantages over prior art barbed hooks. In this regard the barb of this invention is easy to set within the mouth of a fish since the barb's point 34 is sharp and merges into the first linear or slightly concave portion 36 so that the barb readily enters the flesh of the fish's mouth when the point contacts that flesh. The outwardly extending smoothly curved second portion 38 and the under cut contiguous portion 40 provide a stop surface for engaging the flesh of the fish's mouth, once the barb is set, so that the barb is resistant to accidental dislodgement from the flesh of the fish's mouth. However, the curved nature of the barb and the fact that it is only slightly undercut at 40 enables the barb 26 to be purposefully removed from the fish's mouth without difficulty by the user of the hook. This easy removal feature is also of considerable importance to free the hook should it accidently pierce the tissue of a person or become entangled in clothing, fishing nets or other objects.

Without further elaboration the foregoing will so fully illustrate my invention that others may, by applying current or future knowledge, adopt the same for use under various conditions of service.

I claim:

1. A fishing hook comprising a shank portion, a bent return portion, and a barb, said return portion having a longitudinal axis, said barb being located at the upper end of said return portion and terminating in a sharply pointed free end formed by an edge surface, means for preventing the accidental dislodgement of a fish once hooked and for permitting the easy removal of said fish from said barb, said means comprising said edge surface comprising a first portion extending backward from said point at an acute angle to said longitudinal axis, a rounded curved second portion contiguous with said first portion and spaced laterally from said longitudinal axis, and a slightly undercut third portion contiguous with said second portion and merging with said return portion at an acute angle, said edge surface of said first, second and third portions forming a continuous curved surface, with said shank portion, said return portion, and said barb being co-planar.

2. The fishing hook of claim 1 wherein said edge surface is of a semi-tear-drop shape when viewed from the side.

3. The fishing hook of claim 1 wherein said edge surface is relatively blunt.

4. The fishing hook of claim 2 wherein said edge surface is relatively blunt.

5. The fishing hook of claim 1 wherein said curved second portion of said edge surface of said barb is directed toward said shank.

6. The fishing hook of claim 1 wherein said curved second portion of said edge surface of said barb is directed away from said shank.

7. The fishing hook of claim 1 wherein said hook comprises plural return portions each of which includes a barb at its upper end.

8. The fishing hook of claim 7 wherein said edge surface is of a semi-tear-drop shape when viewed from the side.

9. The fishing hook of claim 7 wherein said edge surface is relatively blunt.

10. The fishing hook of claim 8 wherein said edge surface is relatively blunt.

11. The fishing hook of claim 7 wherein said curved second portion of said edge surface of said barb is directed toward said shank.

* * * * *